(12) United States Patent
    Crum (10) Patent No.: US 10,836,936 B1
(45) Date of Patent: Nov. 17, 2020

(54) DISSOLVABLE LINER TAPE AND METHODS OF MAKING AND USING SAME

(71) Applicant: WARD KRAFT, INC., Fort Scott, KS (US)

(72) Inventor: Jesse Crum, Fort Scott, KS (US)

(73) Assignee: Ward-Kraft, Inc., Fort Scott, KS (US)

( * ) Notice: Subject to any disclaimer, the term of this patent is extended or adjusted under 35 U.S.C. 154(b) by 142 days.

(21) Appl. No.: 16/239,258

(22) Filed: Jan. 3, 2019

Related U.S. Application Data (63) Continuation-in-part of application No. 16/144,583, filed on Sep. 27, 2018, now Pat. No. 10,726,746.

(60) Provisional application No. 62/563,942, filed on Sep. 27, 2017.

(51) Int. Cl.
| | |
|---|---|
| B29C 65/00 | (2006.01) |
| C09J 7/32 | (2018.01) |
| C09J 7/20 | (2018.01) |
| C09J 7/38 | (2018.01) |
| G09F 3/02 | (2006.01) |
| B31D 1/02 | (2006.01) |
| G09F 3/10 | (2006.01) |

(52) U.S. Cl.
CPC ............... *C09J 7/32* (2018.01); *C09J 7/201* (2018.01); *C09J 7/38* (2018.01); *B29C 65/00* (2013.01); *B31D 1/021* (2013.01); *B31D 1/027* (2013.01); *C08K 2201/002* (2013.01); *C09J 7/203* (2018.01); *C09J 2201/614* (2013.01); *C09J 2205/102* (2013.01); *C09J 2205/106* (2013.01); *G09F 3/02* (2013.01); *G09F 3/10* (2013.01); *G09F 2003/0222* (2013.01); *G09F 2003/0248* (2013.01)

(58) Field of Classification Search
CPC ............... G09F 3/02; G09F 2003/0222; G09F 2003/0248; G09F 3/10; B31D 1/021; B31D 1/027; B29C 65/00
See application file for complete search history.

(56) References Cited

U.S. PATENT DOCUMENTS

| | | | |
|---|---|---|---|
| 3,574,153 A | 4/1971 | Sirota | |
| 4,575,525 A | 3/1986 | Wacome et al. | |
| 4,623,688 A | 11/1986 | Flanagan | |
| 5,296,535 A | 3/1994 | Nesiewicz et al. | |
| 5,977,021 A * | 11/1999 | Aoyama | B41M 5/30 503/200 |
| 8,109,537 B2 | 2/2012 | Raming | |
| 9,418,576 B2 * | 8/2016 | Franklin | B32B 38/10 |

(Continued)

OTHER PUBLICATIONS

Notice of Allowance dated Apr. 1, 2020, regarding U.S. Appl. No. 16/144,583, 9 pages.

*Primary Examiner* — Mark A Osele
*Assistant Examiner* — Nickolas R Harm
(74) *Attorney, Agent, or Firm* — Avant Law Group, LLC (57) ABSTRACT

A method of configuring tape for securement to a substrate. The tape has a face ply comprising an upper side and a lower side. The method comprises formulating a liner coating by: (a) creating a mixture comprising a non-toxic remoistenable adhesive and activated coconut carbon filtered water; and (b) adding gypsum to the mixture. The method comprises situating an adhesive on the lower side and covering the hot-melt adhesive on the lower side with the liner coating. The method includes using moisture to dispel the liner coating before the tape is applied to the substrate.

20 Claims, 9 Drawing Sheets

(56) References Cited

U.S. PATENT DOCUMENTS

2003/0012910 A1\* 1/2003 Galovic .................... G09F 3/10
  428/40.1
2009/0252905 A1\* 10/2009 Hill ...................... B05D 3/0272
  428/34.2

\* cited by examiner

DISSOLVABLE LINER TAPE AND METHODS OF MAKING AND USING SAME

CROSS-REFERENCE TO RELATED APPLICATIONS

This application is a continuation-in-part of U.S. patent application Ser. No. 16/144,583 filed Sep. 27, 2018, which claims priority to U.S. Provisional Patent Application, Ser. No. 62/563,942 filed Sep. 27, 2017. The disclosure of each of these Applications is incorporated herein by reference in its entirety.

FIELD OF THE DISCLOSURE

The disclosure relates generally to the field of tape. Specifically, the disclosure relates to tape having nonconventional liners. More specifically, the disclosure relates to tape having a liner configured to dissolve upon being moistened, and to methods of making and using such tape.

SUMMARY

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

In an embodiment, a method of configuring tape for securement to a substrate is disclosed. The tape has a face ply comprising an upper side and a lower side. The method comprises formulating a dissolvable liner coating by: (a) creating a mixture comprising a non-toxic remoistenable adhesive and activated coconut carbon filtered water; and (b) adding gypsum to the mixture. The method includes situating a hot-melt adhesive on the lower side, and covering the hot-melt adhesive on the lower side with the dissolvable liner coating. The method comprises using a dispenser to dispense the tape. The dispenser has a moistener for moistening the lower side. The moistening dispels the dissolvable liner coating to expose the hot-melt adhesive.

In another embodiment, a method of configuring tape for securement to a substrate is disclosed. The tape has a face ply comprising an upper side and a lower side. The method comprises formulating a dissolvable liner coating by mixing a non-toxic remoistenable adhesive, activated coconut carbon filtered water, and gypsum. The method includes situating an adhesive on the lower side, and covering the adhesive on the lower side with the dissolvable liner coating. The method comprises using a dispenser to dispense the tape. The dispenser has a moistener for moistening the lower side. The moistening dispels the dissolvable liner coating to expose the adhesive.

In yet another embodiment, a method of configuring tape for securement to a substrate is provided. The tape has a face ply comprising an upper side and a lower side. The method comprises formulating a liner coating by: (a) creating a mixture comprising a non-toxic remoistenable adhesive and activated coconut carbon filtered water; and (b) adding gypsum to the mixture. The method comprises situating an adhesive on the lower side and covering the hot-melt adhesive on the lower side with the liner coating. The method includes using moisture to dispel the liner coating before the tape is applied to the substrate.

BRIEF DESCRIPTION OF THE SEVERAL VIEWS OF THE DRAWINGS

Illustrative embodiments of the present disclosure are described in detail below with reference to the attached drawing figures and wherein.

DETAILED DESCRIPTION

The disclosure relates generally to a novel dissolvable liner usable in a plethora of applications requiring selective shielding of adhesive, such as labels, tape, etc. These applications and the use of the novel dissolvable liner therewith are discussed in-turn. The artisan will understand from the disclosure herein that the dissolvable liner is usable in other applications that can benefit from selectively covering one or more adhesives, such as envelopes, building materials, etc.

As is known, a shipping label is adhered to a package and identifies the sender and recipient of the package. Conventional shipping labels have a front face for the printing of indicia and a back face that is adhered to the package. Traditionally, the back face is covered with adhesive, and a liner is removably secured to the back face via this adhesive. Prior to use, the liner is removed, either by hand or otherwise, to expose the adhesive, and the label (specifically, the face ply thereof as discussed herein) is adhered to the package being delivered using the exposed adhesive. As is known, during transportation or otherwise before the label is adhered to a substrate, the liner covers the adhesive to ensure that the label does not undesirably stick to objects (e.g., other labels, print heads or other components of apparatus used to make and/or print the label) other than the substrate to which is the label is to be adhered.

The label liner is traditionally a single-use, disposable object. Considering that there are many millions of shipping labels in use each day, disposal of these liners of each of these many labels represents significant waste. It may be desirable to reduce this waste to lower the cost and the carbon footprint of labels on the world; particularly when this waste is reduced without adversely affecting the quality or capabilities of the label, or their ease of use.

Figure 1:
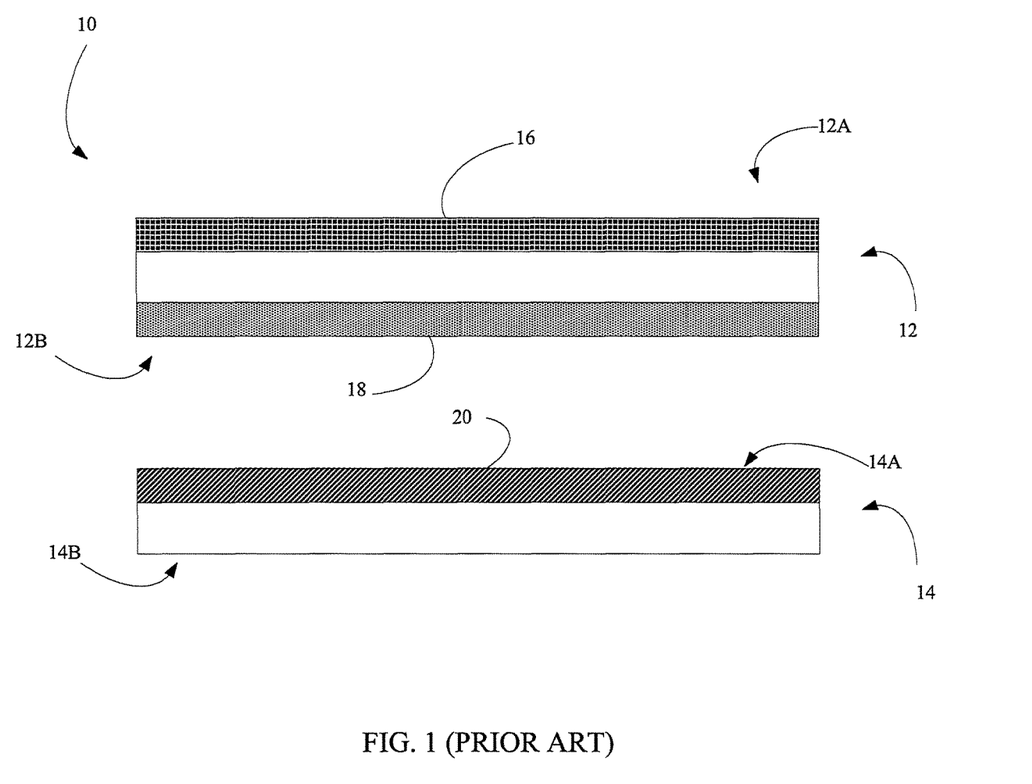
FIG. 1 is schematic representation of a PRIOR ART label.

FIG. 1 shows a conventional label 10, as is known in the art. The label 10 has a face ply 12 and a liner 14. The face ply 12 is typically made of paper. The face ply 12 has an upper side 12A and a lower side 12B. At least the top side 12A of the face ply 12 may contain a topcoat 16. The topcoat 16 is a coating configured for the reception of printed indicia and/or which otherwise improves the appearance or functionality of the face ply 12. A layer of adhesive 18 is disposed on the lower side 12B of the face ply 12 to allow the liner 14 to be coupled to the face ply 12.

The liner 14 is most commonly made of paper or polyester (PET). The prior art liner 14 may also be referred to herein as a liner ply because the prior art liner 14 comprises a ply (or multiple plies) of paper, polyester (e.g., film), etc. The liner ply 14 has a top side 14A and a bottom side 14B. The top side 14A of the liner ply 14 contains a release agent (e.g., silicone) 20. The liner ply 14 is adhered to the face ply 12 such that the release agent 20 on the top side 14A of the liner ply 14 is adjacent and in contact with the adhesive 18 disposed on the lower side 12B of the face ply 12. The release agent 20 may ensure that the adhesion between the top ply 12 and the bottom ply 14 is releasable; that is, the liner ply 14 may be selectively disassociated from the face ply 12 to expose the adhesive 18 on the lower side 12B of the face ply.

In use, the liner ply 14 is releasably adhered to the face ply 12. The label 10 is then passed through the printer to print indicia on the topcoat 16. During the printing process, the liner ply 14 covers the adhesive 18 and ensures that the adhesive 18 does not interact with the printer. Once the printing is complete, the liner ply 14 is disassociated from the face ply 12 to expose the adhesive 18. The face ply 12 is then adhered to a substrate (e.g., a package, a box, an envelope, or other object or surface to which the label is adhered) via the adhesive 18 and the liner ply 14 is disposed in a trash can or elsewhere.

As noted, disposable liner plies represent significant waste and cost. The prior art indicates that efforts have been made to configure a label without a disposable liner. U.S. Pat. No. 8,109,537 illustrates one example of a label devoid of a disposable liner. The '537 Patent label includes a single ply which comprises adhesive on one side and a release material on the other. This "linerless" configuration allows for multiple labels to be removably overlaid to one another, e.g., on a roll. Specifically, the release material of the underlying label ensures that this label does not permanently adhere to the overlaid label because of the adhesive thereof.

As the '537 Patent's linerless labels are devoid of a conventional liner, they address at least some of the deficiencies associated with conventional liners. However, the '537 Patent's (and other such) linerless labels present other issues that must be addressed. Because a liner is absent from the label, the adhesive on the labels is exposed to the printer during the printing process, and may cause the label to undesirably stick to the printer roller necessitating expensive repairs. To alleviate this concern, the linerless labels are typically printed with specialty printers having coated rollers (e.g., direct thermal printers having rollers comprising silicone embedded rubber) specifically adapted to ensure that the labels do not adhere thereto. Much if not all of the cost savings associated with the liner are lost in purchasing and configuring the specialty printing equipment, which is undesirable. Further, the artisan understands that because of the configuration of such linerless labels, these labels cannot be printed using laser printers, thermal transfer printers, or any printer other than direct thermal printers.

It may be advantageous to have a label that does not suffer from the disadvantages associated with conventional liners. It may further be desirable to have a label that does not suffer from the drawbacks of linerless labels, and which, like traditional labels having liners, can be printed via any off-the-shelf printer. The present disclosure may provide for such a label.

Figure 2:
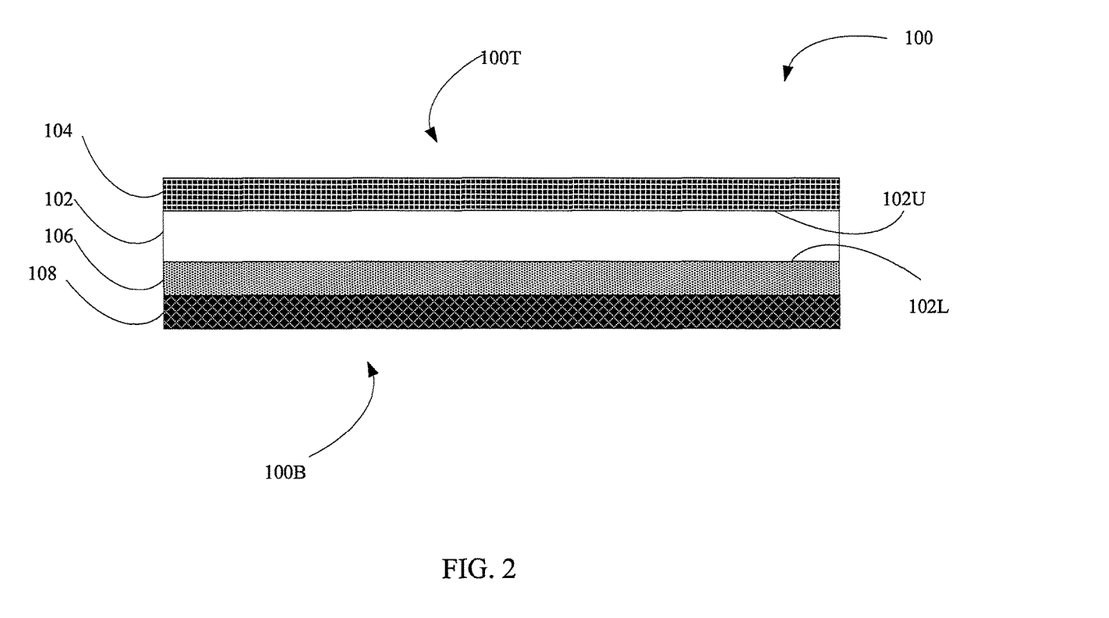
FIG. 2 is a schematic representation of a label employing a dissolvable liner, according to an embodiment of the present disclosure.

Focus is directed now to FIG. 2, which shows one example embodiment 100 of a label having a dissolvable liner, according to the teachings of the present disclosure. The illustrated label 100 has a top side 100T and a bottom side 100B. As discussed herein, indicia may be printed on the top side 100T and the label 100 may be adhered to a substrate at the bottom side 100B.

In more detail, the label 100 may have a face stock 102, which may have an upper side 102U and a lower side 102L. The face stock 102 may comprise a solitary ply 102, made e.g., of paper. This face stock 102 may also be referred to herein as a face ply to indicate that the face ply comprises a solitary ply. Alternately, in other embodiments, the face stock 102 may contain more than one ply. In other embodiments still, the face stock 102 may comprise a film (e.g., a clear film) or other printable substrate.

The face ply 102, at its upper side 102U, may be provided with a topcoat 104. The topcoat 104, akin to the topcoat 16 of the prior art label 10, may be configured for the reception of printed (e.g., black and/or colored) indicia (e.g., content configured to be consumed by consumers). The lower side 102L of the face ply 102 may contain a layer of adhesive 106. The adhesive 106 may be a hot-melt adhesive, an acrylic adhesive, a combination thereof, and/or any other adhesive now known or subsequently developed.

As discussed above, in linerless labels, the adhesive (e.g., the adhesive 106) at the bottom sides of the labels is uncovered, and the top sides of the labels contain silicone which precludes one label from undesirably sticking to another label in contact therewith (e.g., when the linerless labels are stacked together). While such a configuration precludes undesirable attachment between one label to another (e.g., precludes securement of stacked linerless labels), the exposed adhesive of the linerless labels may nevertheless cause the linerless labels to undesirably adhere to other objects with which the linerless labels come into contact with. In the dissolvable liner label 100, conversely, the layer of adhesive 106 is temporarily and selectively covered to preclude the adhesive 106 from causing the label 100, e.g., the face stock 102 thereof, to unintentionally adhere to any object that comes into contact with the label 100. When the user desires to adhere the face stock 102 to a substrate, the user may then cause the adhesive 106 to become exposed so that the face ply 102 may be secured to a substrate. As discussed herein, unlike labels having traditional liner plies, the user may cause the adhesive 106 of the label 100 to be exposed without the need to discard any liner in a waste basket or elsewhere.

In an embodiment, the bottom side 100B of the label 100 may include a dissolvable liner 108 that is in contact with the adhesive 106. The dissolvable liner 108 may be outwardly adjacent the adhesive 106 such that a distance between the adhesive layer 106 and the face ply upper side 102U may be less than a distance between the dissolvable liner 108 and the face ply upper side 102U. The dissolvable liner 108 may temporarily cover the adhesive 106 until the label 100 is to be adhered to a substrate. The phrase "dissolvable liner", as used herein, refers to a cover for covering a first composition, which cover is specifically adapted to dissolve or otherwise dispel when the cover is brought into contact with a second composition to thereby expose the first composition. In embodiments, the first composition may be the adhesive 106 and the second composition may be water (e.g., water vapor, liquid water, etc.). That is, in embodiments, the dissolvable liner 108 may be a composition that: (a) covers the adhesive 106 so as to preclude the face ply lower side 102L on which the adhesive 106 is situated from sticking to another object or surface; and (b) is configured to dissolve and/or dispel when the dissolvable liner 108 is brought into contact with water to expose the adhesive 106 so that the face ply lower side 102L may be adhered to the desired substrate via the adhesive 106. The term "dissolvable liner", as used herein, specifically excludes a traditional liner ply or plies, e.g., paper coated at least in part with silicone or other release material, a film, etc. The term "dissolve", as used herein, connotes that the dissolvable liner coating, once wetted, is dispelled and absorbed by the substrate. In embodiments, the dissolvable liner 108 may not have any (or any appreciable) adhesion. For example, while the dissolvable liner 108 is covering the adhesive 106 and before the dissolvable liner 108 is brought into contact with water, the dissolvable liner 108 may not undesirably cause the face ply 102 to stick to objects that come in contact with the face ply lower side 102L.

In an embodiment, the dissolvable liner 108 may comprise a non-toxic remoistenable adhesive 222, activated coconut carbon filtered water 224, and powdered gypsum 226. The activated coconut carbon filtered water 224—which, as is known, may be devoid of many of the impurities found in tap water—may desirably affect the viscosity of the remoistenable adhesive 222 for the instant application. Further, it is believed that the activated coconut carbon filtered water 224 may allow the final dissolvable liner 108 composition to disintegrate and dissolve readily upon the application of tap water (as discussed below). The powdered gypsum 226 may serve, among other things, to increase the stability and the temperature resistance of the remoistenable adhesive 222. The gypsum 226 may also serve as a blocking agent, e.g., preclude the remoistenable adhesive 222 from being undesirably activated in humid ambient conditions. In embodiments, the liner 108 may include different (e.g., additional) ingredients. For example, where it is desired to give the dissolvable liner 108 a hue (e.g., an off-white (or any other) hue such that the dissolvable liner 108 resembles the traditional paper liners), a colored pigment may be included to impart such a hue to the liner 108.

Table 1 below shows the constituents of the dissolvable liner (also referred to herein as a "dissolvable liner coating") 108, according to one illustrative embodiment of the present disclosure, with which the label 100 (specifically the bottom side 100B thereof) may be coated to preclude the adhesive 106 from undesirably coming into contact with objects until after the label 100 has been printed and is ready to be adhered to a substrate. The dissolvable liner 108 may temporarily cover the adhesive 106 while the top coat 104 is exposed for printing. Because the adhesive 106 is covered during the printing process, the label 100 may be printed using any technology now known or subsequently developed that is usable to print the prior art label 10 (such as a direct thermal printer, a thermal transfer printer, a laser printer, an inkjet printer, etc.). The dissolvable liner 108 may prevent the adhesive 106 from coming into contact with any object (e.g., a printer roller, another label, a table or other surface) before it is time to adhere the label 100 to the substrate. The dissolvable liner 108 may be heat-resistant and may be able to readily withstand the relatively high temperatures encountered by labels in printers. Further, the dissolvable liner 108—which may comprise a non-toxic remoistenable adhesive as a constituent thereof as discussed herein—may as a whole be a non-sticky substance when dry. Thus, when the dissolvable liner 108 is applied to the lower side 102L of the face ply 102, it may cover the adhesive 106 (e.g., the hot melt adhesive 106) without itself causing the face ply lower side 102L to undesirably stick to surfaces with which the lower side 102L comes into contact.

TABLE 1

DISSOLVABLE LINER 108

| No. | Ingredient 202 | Quantity range 204 | Preferred quantity 206 |
|---|---|---|---|
| 1 | Non-toxic remoistenable adhesive 222 | 2 lbs. to 6 lbs. | 4 lbs. |
| 2 | ACC water 224 | 0.125 lbs. to 0.375 lbs. | .25 lbs. |
| 3 | Gypsum 226 | 1-50 heaping teaspoons (about 0.05 lbs. to 2.8 lbs.) | 21 heaping teaspoons (about 1.2 lbs) |

The quantity ranges 204 and the preferred quantities 206 of the various ingredients 202 listed above are merely exemplary and are not intended to be independently limiting. For example, in embodiments, more activated coconut carbon filtered water 224 ("ACC water") may be added to reduce the viscosity of the dissolvable liner coating 108, more gypsum 226 may be added to further enhance the stability of the adhesive 222, etc. Further, in embodiments, the preferred quantities 206 of the various ingredients 202 listed above may be proportionally reduced or increased for smaller or larger applications, respectively. The preferred quantities 206 listed above will yield a volume of about 5.45 lbs. of the dissolvable liner coating 108, which may be used to coat many thousands of labels 100 to cover the adhesive layers 106 thereof.

In an embodiment, the remoistenable adhesive 222 may have a vapor pressure at 20° C. of about 23.4 hPa, a density at 20° C. of about 1.08 g/cm$^3$, a pH value at 20° C. of 4.0-6.0, a flash point of over 232° C., and a VOC content of 1.6 g/l/0.01 lb/gl. For example, in an embodiment, the remoistenable adhesive 222 may be the PriscoBond 121-H remoistenable adhesive commercially available by Prisco®. Alternately or additionally, in other embodiments, the remoistenable adhesive may be one or more of the remoistenable adhesives disclosed in U.S. Pat. No. 3,574,153 to Sirota, U.S. Pat. No. 4,575,525 to Wancome et al., U.S. Pat. No. 4,623,688 to Flanagan, U.S. Pat. No. 5,296,535 to Fazioli et al., each of which are incorporated by reference herein as if fully set forth herein. Other remoistenable adhesives known to the artisan and/or subsequently developed may likewise be employed. The artisan will appreciate from the disclosure herein that the invention is not directed solely to the non-toxic remoistenable adhesive 222—which may in embodiments be commercially available—but generally to the dissolvable liner composition that contains the remoistenable adhesive 222 as a constituent thereof and the use of this dissolvable liner composition to temporarily and selectively cover the adhesive 106 until the face ply 102 is to be adhered to a substrate. Applicant's experimentation confirms that off-the-shelf remoistenable adhesives 222 disclosed herein, such as the PriscoBond 121-H product, cannot be used as adhesive covers for labels until the other ingredients 202 (i.e., the ACC water 224 and Gypsum 226) are added thereto.

Figure 5:
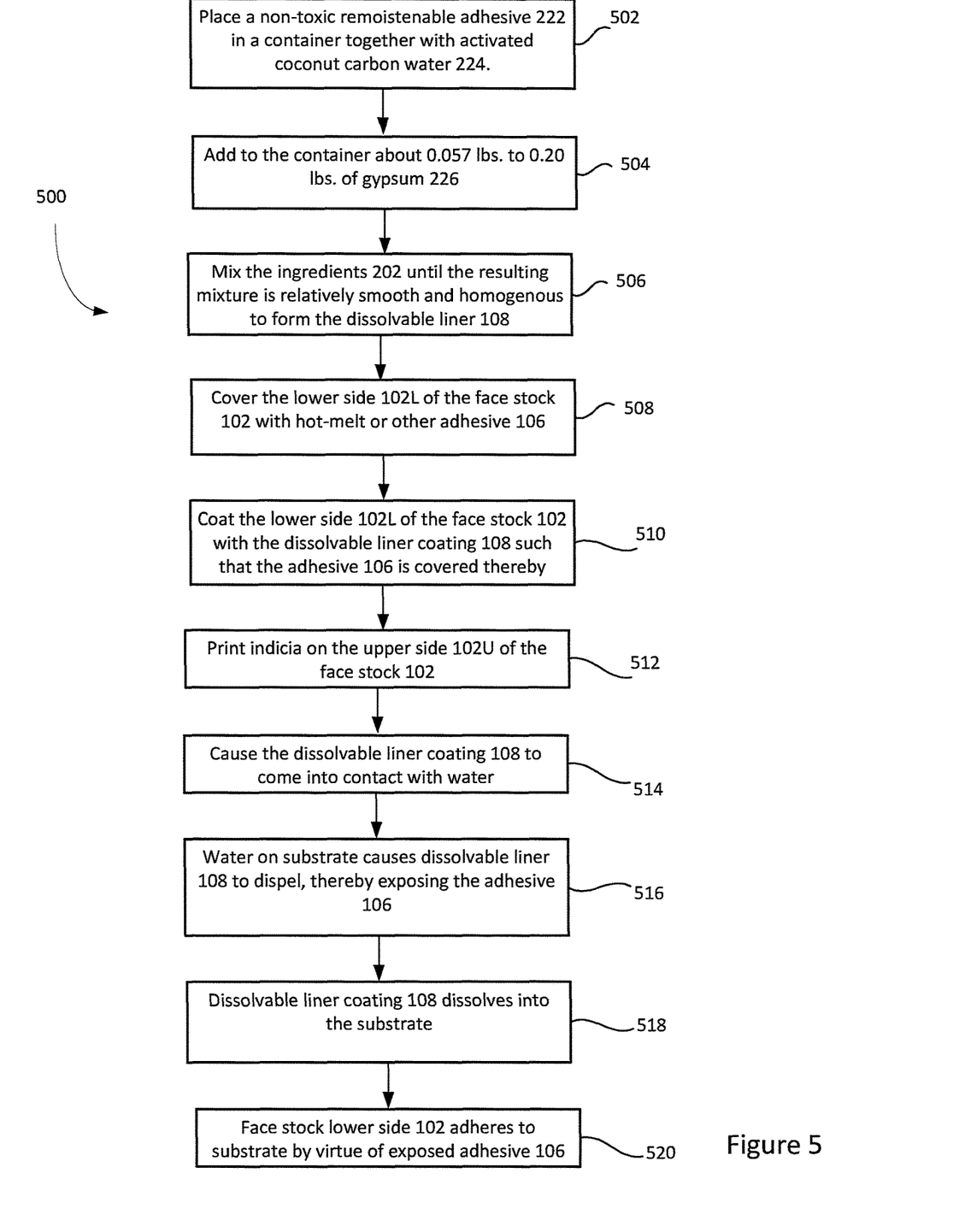
FIG. 5 is a flow chart illustrating a method of making the dissolvable liner and using a label employing same.

FIG. 5 is a flow chart illustrating a method of making and using the dissolvable liner 108, in an embodiment. At step 502, a non-toxic remoistenable adhesive 222 may be placed in a container together with activated coconut carbon filtered water 224. For example, 4 lbs. of PB121-H-Prisco® may be weighed and placed in a container together with 0.25 lbs. of activated coconut carbon filtered water. Thereafter, at step 504, about 1.2 lbs. (i.e., about 21 heaping teaspoons) of gypsum 226 may be placed in the container. At step 506, the ingredients 202 may be mixed together. For example, in an embodiment, a cutting blade spinning at about 2,000 rpm may be used to mix all the ingredients 202 until the resulting mixture 108 becomes relatively smooth and homogenous. At step 508, a label face stock 102 with the lower side 102L thereof covered with adhesive 106 (e.g., a hot-melt or other suitable adhesive) may be provided. At step 510, the adhesive 106 may then be coated with the dissolvable liner 108 (i.e., the dissolvable liner coating 108 may be applied to the lower side 102L such that the adhesive 106 is between the lower side 102L and the dissolvable liner coating 108; the dissolvable liner coating 108 may dry in a matter of minutes or seconds, and when dried, may serve to cover the adhesive 106 and preclude same from unintentionally coming into contact with an object).

At step 512, indicia may be printed on the upper side 102U of the face stock 102 (e.g., on the top coat 104 thereof). The label 100 may now be printed using any printer (including any conventional printer, such as a direct thermal printer, a thermal transfer printer, a laser printer, etc.). Specifically, as the label 100 is passed through the printer, the topcoat 104 thereof may receive printed indicia whereas the dissolvable liner 108 may cover the adhesive 106 and preclude direct contact between the adhesive 106 and the printer parts.

The dissolvable liner 108 may be configured to dispel (or otherwise disintegrate) when the liner coating 108 comes into contact with water (e.g., water vapor, liquid water, sprayer containing tap water, etc.) and/or, in embodiments, one or more other liquids. As such, when the face ply 102 is ready to be adhered to a substrate, the dissolvable liner coating 108 may be brought into contact with water at step 514 to cause the dissolvable liner coating 108 to dispel to expose the underlying adhesive 106. The terms "water" and "moisture" may be used interchangeably herein.

Moisture may be introduced to the face ply 102 directly and/or indirectly. In an embodiment, the substrate (e.g., the box, package, envelope, etc.) and/or a section thereof may be moistened with water and the label bottom side 100B may be placed on the moistened section of the substrate so as to allow the dissolvable liner coating 108 to interact with the moisture on the substrate (indirect moistening) and dissolve into the substrate. In another embodiment, instead of moistening the substrate and then placing the face ply 102 on the moistened substrate, the face ply 102 (i.e., the dissolvable liner coating 108 thereof) itself may be moistened to cause the dissolvable liner coating 108 to dispel (direct moistening) and then the face ply 102 may be situated on the substrate where the dissolvable liner coating 108 may be adsorbed thereby. Applicant's experimentation has shown that if the moisture is applied directly to the dissolvable liner coating 108 on the face stock 102, the face stock 102 may then be adhered to the substrate any time within the next 30-120 seconds or so (after which time the dissolvable liner coating 108 may re-dry and may have to be rewetted to use the label 100). Alternately, if the substrate is moistened instead of directly moistening the dissolvable liner coating 108, then the face ply 102 may have to be placed on the moistened section of the substrate within 3-20 seconds or so (as the moisture may thereafter be absorbed by the substrate and may not be able to serve to dissolve the dissolvable liner coating 108). In some embodiments, moisture may be introduced to the dissolvable liner coating 108 both directly and indirectly (i.e., the substrate may be moistened and the dissolvable liner coating 108 may also be moistened before the face ply 102 contacts the moistened substrate).

In embodiments, water may be added to the substrate and/or the face ply 102 via a sprayer. Use of a sprayer may allow for a small volume of water to be disposed on the substrate and/or the face ply 102 and may reduce the risk that the amount of water disposed on the substrate will cause any damage thereto. In other embodiments, water may be added to the substrate and/or the face ply 102 via other means (e.g., via different water dispensing mechanism, via a moistened cloth or wipe, etc.).

At step 516, the moisture introduced to the dissolvable liner coating 108 (e.g., directly and/or indirectly) may cause the dissolvable liner coating to dispel and expose the adhesive 106. At step 518, if the moisture was introduced to the face ply 102 directly (e.g., if water was sprayed or otherwise placed directly onto the face ply 102), the face ply 102 may now be situated on the substrate, and the substrate may absorb the dissolvable liner coating 108 leaving the exposed adhesive. Conversely, if the moisture was introduced to the face ply 102 indirectly (e.g., a section of the substrate was moistened and the face ply 102 was placed on the moistened section of the substrate), the moisture on the substrate may cause the dissolvable liner coating 108 to dispel and the coating 108 may be absorbed by the substrate.

At step 520, the label 100 may now adhere to the substrate by virtue of the exposed adhesive 106. In this way, by using water to cause the dissolvable liner 108 to dissolve into the substrate, the adhesive 106 may be covered until the label 100 is to be applied to the substrate and the requirement for a traditional liner ply may be negated. The amount of water (e.g., the water sprayed onto the substrate) used to dissolve the liner 108 may be negligible and may not cause any appreciable damage to the substrate. Once the dissolvable liner coating 108 is wetted (directly or indirectly) and the face ply 102 is situated on the substrate, the dissolvable liner 108 may dissolve relatively quickly such that the label 100 can generally simultaneously be adhered to the substrate via the adhesive 106. That is, dissolving of the dissolvable liner coating 108 into the substrate in step 518 and adherence of the face ply 102 to the substrate in step 520 may occur generally simultaneously.

Thus, as has been described, the dissolvable liner 108 may, in effect, replace the traditional liner plies of prior art labels, and the label 100 may be used in any application where prior art labels were heretofore employed.

The illustrated label 100, as discussed herein, may be configured for single-sided printing. Such, however, is merely exemplary, and the dissolvable liner concept disclosed herein may likewise be used with labels that are printable on both sides. Focus is directed to FIGS. 3A-3C to illustrate a label 300 employing the dissolvable liner 108 that is printable on both sides.

Figure 3A:
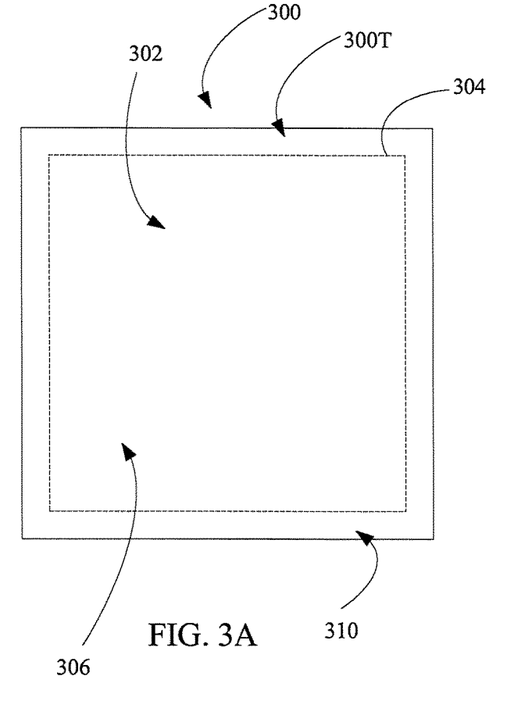
FIGS. 3A-3C show another embodiment of the label of FIG. 2.
Figure 3B:
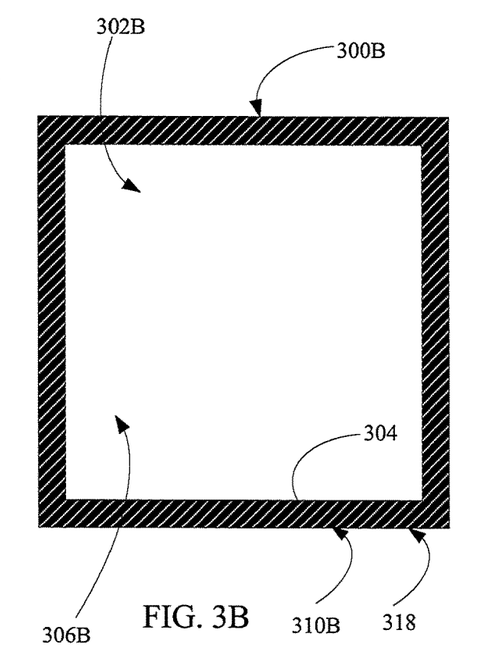

The label 300 may have a top side 300T (FIG. 3A) and a back side 300B (FIG. 3B). The top side 300T may include a topcoat 302 comprising printable coating. The topcoat 302 may allow the top side 300T to receive monochrome or color printing via any printing means now known or subsequently developed.

The label 300 may, in an embodiment, include a perforation (or a line of weakness) 304. The perforation 304 may demarcate a central portion 306 circumscribed by a border portion 310. In embodiments, the central portion 306 may be separable form the border portion 310 along the perforation 304. On the top side 300T, in embodiments, each of the central portion 306 and the border portion 310 may comprise the printable coating 302. In other embodiments, the border portion 310 may be devoid of the printable coating 302.

Figure 3C:
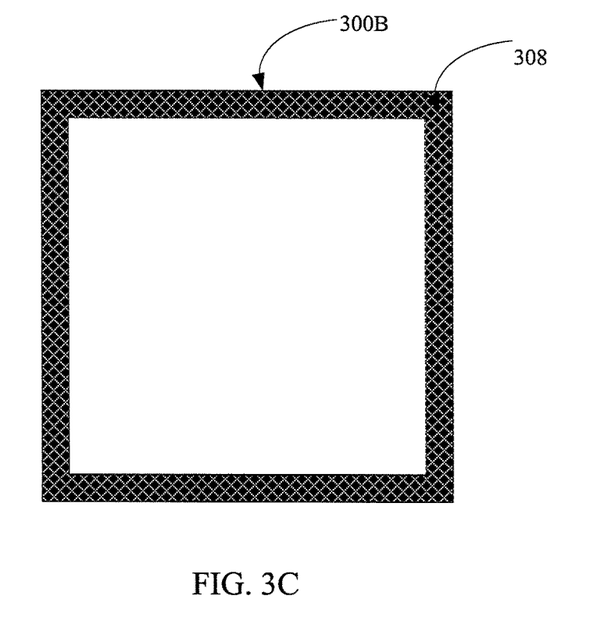

FIG. 3B shows the back side 300B of the label 100. The backside 306B of the central portion 306 may also include a printable coating 302B, which may allow the backside 306B of the central portion 306 to be printed in any printer. The border portion 310, at the back side 310B, may include adhesive 318. As shown in FIG. 3C, this adhesive 318 may be coated by the dissolvable liner coating 308 (coating 308 and coating 108 discussed above may be made in the same way). The coating 308 may temporarily cover the adhesive 318 and preclude the adhesive 318 from unintentionally coming into contact with an object (e.g., a printer roller) until the label 300 is ready to be applied to a substrate. The label 300 may thus be printed on both sides (e.g., in a double sided printer or otherwise). When it is time to adhere the label 300 to a substrate (e.g., a package), the substrate may be moistened (e.g., a small quantity of water may be sprayed on the portion of the substrate to which the label 300 is to be applied). The label 300 may then be brought into contact with the substrate such that the back side 300B, and specifically the dissolvable liner 308 coating disposed thereon, contacts the moistened substrate. The moisture may cause the dissolvable liner 308 to dissolve into the substrate, thereby exposing the adhesive 318. The adhesive 318, now exposed, may cause the label back side 300B to adhere to the substrate. When the recipient receives the package, he may disassociate the central portion 306 from the border portion 310 via the perforations 304, and access the indicia printed on the back side 300B of the label 300. In this way, thus, the dissolvable liner concept disclosed herein may be used to do away with wasteful and relatively expensive conventional liners of both single-sided and double-sided labels.

In the embodiments discussed above, the dissolvable liner (e.g., the liner 108 and/or 308) is displaced by the water and is absorbed by the substrate to which the label is to be adhered. In some applications, however, the substrate may be unable to dissolve water (or other liquids). For example, where the substrate is glass, a plastic film, etc., it may be unable to dissolve the dissolvable liner displaced from the label by the moistening of the substrate. In these embodiments, the displaced dissolvable liner may be caused to be dissolved by the label itself, e.g., by a hydrophilic coating disposed thereon. FIGS. 4A-4D illustrate these concepts in additional detail.

Figure 4A:
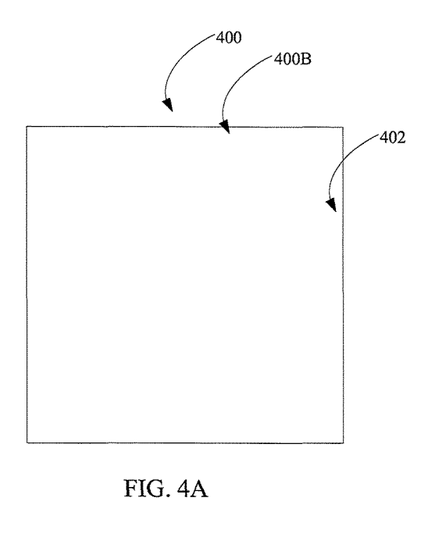
FIGS. 4A-4D show yet another embodiment of the label of FIG. 2.
Figure 4B:
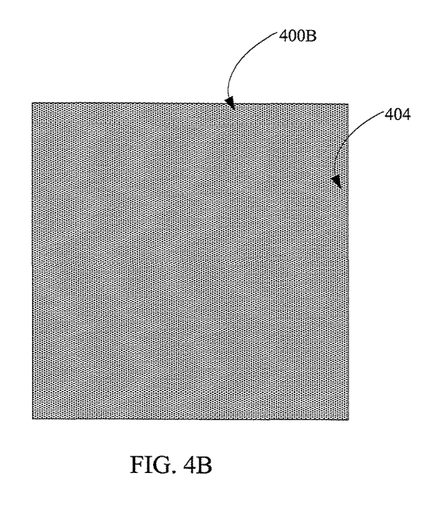
Figure 4C:
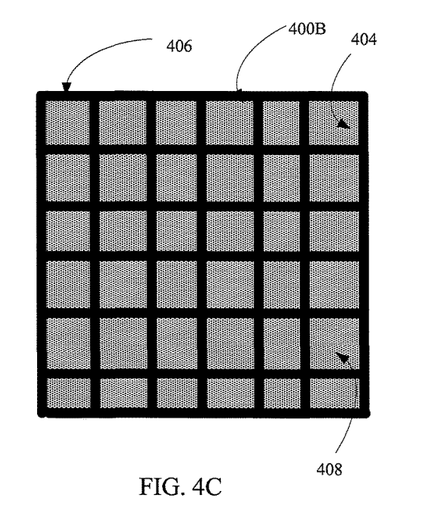
Figure 4D:
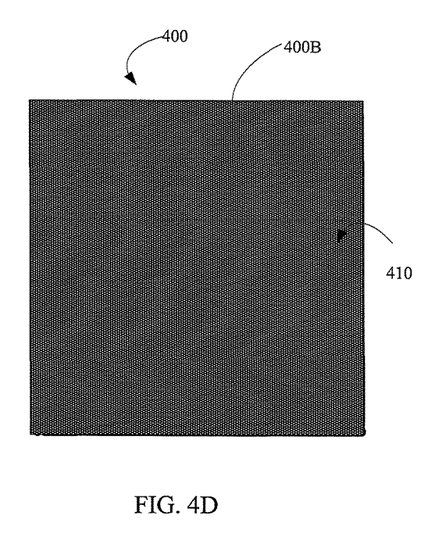

Specifically, FIGS. 4A-4D show another embodiment 400 of a label comprising a dissolvable liner. In more detail, FIGS. 4A-4D show one example method of making the label 400. The label 400 depicted in FIG. 4D is ready to be used, and is depicted in its initial stages in FIGS. 4A, 4B, and 4C for illustrative purposes.

FIG. 4A shows a back side 400B of the label 400. The label 400 may comprise, e.g., printable film or other suitable materials. In an embodiment, the label 400 may comprise a solitary ply 402. The ply 402, on its front side (not expressly shown in FIG. 4A), may comprise printable coating to receive printed indicia, as discussed above for other embodiments.

As shown in FIG. 4B, the back side 400B may first be coated with a coating 404. The coating 404 may be a hydrophilic coating (i.e., a coating configured to absorb water). In an embodiment, the coating 404 may be, e.g., an inkjet coating. In another embodiment, soft feel coating or other such coating may be employed. In some embodiments, the coating 404 may be a combination of two or more hydrophilic coatings; alternately, the coating 404 may be a combination of substances that, when mixed together, have a tendency to absorb water. The artisan understands that many such coatings are commercially available today.

Next, as shown in FIG. 4C, a pattern of adhesive 406 (such as a hot-melt adhesive or other conventional adhesive) may be disposed on the hydrophilic coating 404. The pattern 406 may be any pattern (e.g., a checkerboard pattern, a dot pattern, etc.), and may but need not be symmetrical. The pattern 406 may include openings 408, i.e., areas that are devoid of the adhesive.

Then, as shown in FIG. 4D, the dissolvable liner coating 410 (which may be generally identical to the dissolvable liners 108 and 308 discussed above) may be applied to the label back side 400B such that the dissolvable liner 410 covers the adhesive pattern 406. The dissolvable liner 410, unlike the adhesive pattern 406, need not be applied in a pattern. The label 400 (e.g., the front side thereof) may then be printed, e.g., in a direct thermal, thermal transfer, laser, or other printer, and the dissolvable liner 410 may cover the adhesive pattern 406 during the printing process to ensure that the label 400 does not undesirably stick to the printer components. The printed label 400 may now be ready for use with any substrate, including substrates that are unable to absorb water and/or substrates that absorb water very slowly.

Assume, for example, that the label 400 is to be applied to a glass substrate (or to a plastic film or other such substrate). The glass may be moistened (e.g., water may be sprayed thereon) and the label back side 400B may be brought adjacent the glass such that the dissolvable liner 410 contacts the moistened glass surface. The moisture on the glass surface may displace the dissolvable liner 410 but may be unable to dissolve same. However, the dissolvable liner 410 may pass through the openings 408 in the adhesive pattern 406 and contact the hydrophilic coating 404. The hydrophilic coating 404 may therefore absorb the dissolvable liner 410. The adhesive pattern 406, which is now exposed, may be used to secure the label 400 to any substrate.

FIGS. 4A-4D show illustrate an embodiment where the substrate to which the dissolvable liner label 400 is to be adhered is unable to absorb the dissolvable liner coating and/or water. The artisan will also appreciate from the disclosure herein that, in embodiments, the face ply of the dissolvable liner label may itself comprise film (instead of paper, for example) or other material(s) that are incapable of absorbing moisture.

Thus, as has been described, the dissolvable liner disclosed herein may serve to do away with traditional label liners, and in so doing, provide an environmentally friendlier label. Moreover, the labels using the dissolvable liners disclosed herein may significantly reduce the manufacturing costs of the labels. Indeed, according to some preliminary estimates, the dissolvable liner may reduce the cost of traditional labels (i.e., labels having silicone laden liner plies) by up to 50%.

While embodiments of the dissolvable liner may be incorporated with labels as described above, other embodiments of the dissolvable liner may be incorporated with tape, such as adhesive tape. Conventional adhesive tape may use a remoistenable adhesive. That is, conventional adhesive tapes may use a type of adhesive that must be moistened, often with water, before the adhesive is active for adhering to a substrate. The remoistenable adhesive of the conventional tape may require a relatively large amount of water to activate, and once the remoistenable adhesive has been activated, it may have reduced adhering strength in subsequent activations if left to dry without being applied to a substrate.

Figure 7:
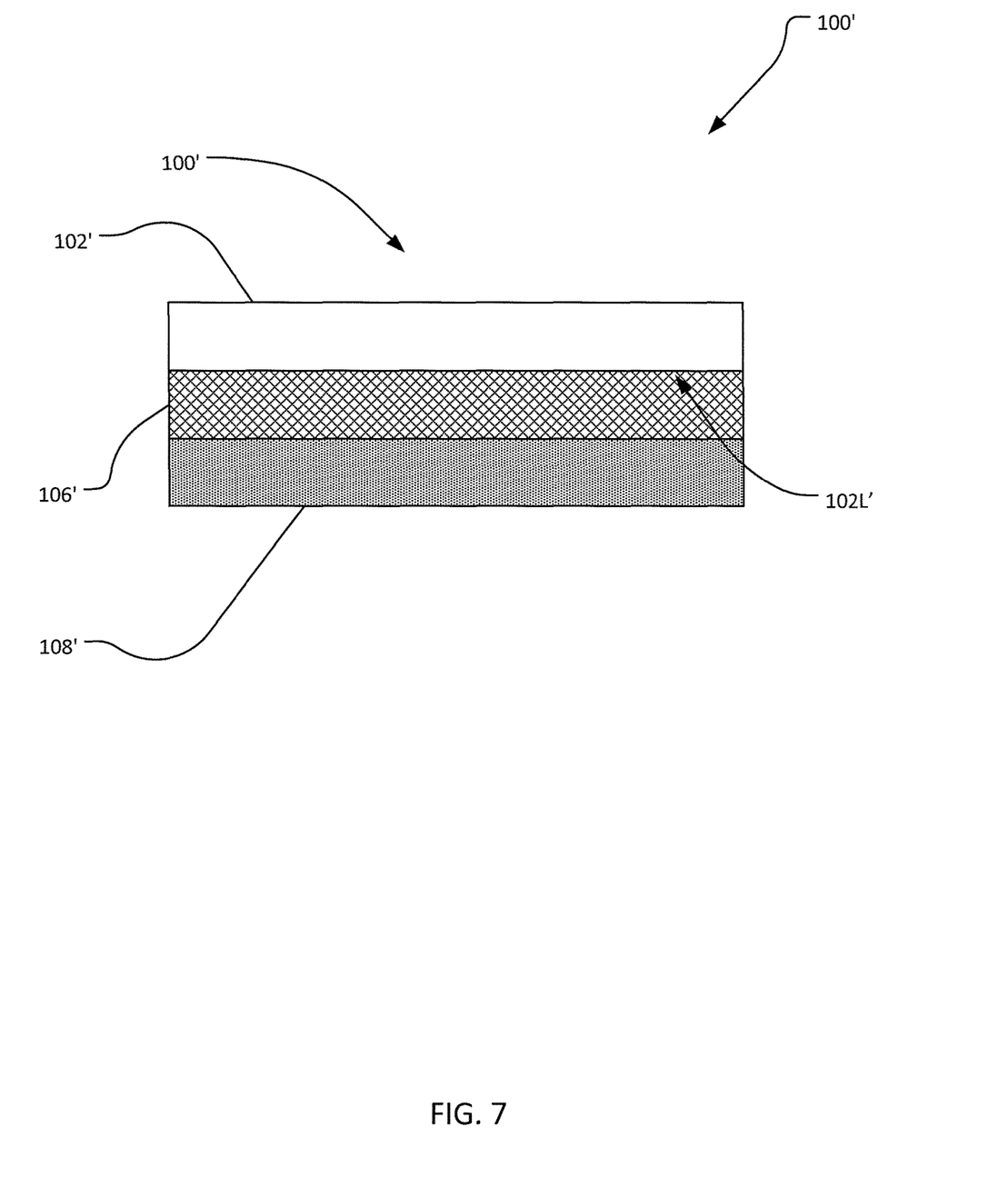
FIG. 7 is a schematic representation of the tape usable in the dispenser of FIG. 6.

In some embodiments, the dissolvable liner of label 100, and its embodiments (e.g., embodiments 300 and 400), may instead be used in an adhesive tape 100' (e.g., masking tape, painter's tape, duct tape, packaging tape, etc.). The adhesive tape embodiments 100' may have many of the same or similar components as the label 100. For example, and as shown in FIG. 7, the adhesive tape 100' may have a face ply 102' (e.g., paper or film) corresponding to face ply 102, adhesive 106' corresponding to adhesive 106, and a dissolvable liner 108' corresponding to dissolvable liner 108. The dissolvable liner 108' may be made with ingredients 202 (e.g., remoistenable adhesive 222, activated coconut carbon filtered water 224, and powdered gypsum 226) as discussed above. A difference between the label 100 and the adhesive tape 100' may be that the adhesive tape 100' may have a relatively long length compared to the label 100 (e.g., while the label 100 may be around the size of a shipping label, the adhesive tape 100' may be a relatively long length of tape which may be wrapped around a cylinder). Indicia (e.g., icons, text, logos, graphics, colors, etc.) may still be printed or otherwise added to the face ply 102' (e.g., the top side 100T' of the face ply 102'). The adhesive tape 100' may have indicia printed thereon via thermal transfer methods (e.g., flexo printing, offset printing, etc.). In embodiments, the face ply 102' of the tape 100' may not be printable. Such may provide cost savings as compared to printable table.

One advantage the adhesive tape 100' may have over conventional adhesive tape that has a remoistenable adhesive layer (e.g., gummed kraft paper) is that a total thickness of the adhesive 106' layer of the adhesive tape 100' may be less than a total thickness of the adhesive layer of the conventional adhesive tape. For example, the conventional adhesive tape adhesive layer may have a typical thickness of around 2-4 mm, while the adhesive tape 100' adhesive 106' layer may be around 0.7 mm thick. This difference in adhesive layer thickness may allow for more adhesive tape 100' to be packed onto a roll than conventional adhesive tape might allow, for example, which may result in reduced costs for the adhesive tape 100'. Further, the artisan will understand that the reduced amount of adhesive necessary to create the workable tape 100' may yield significant cost savings.

Similarly, the tape 100' may require less water for application relative to conventional remoistenable adhesive tape. In embodiments, the adhesive tape 100' may require about $\frac{1}{10}^{th}$ of the amount of water a conventional remoistenable adhesive tape would require to activate the adhesive layer for adhering to a substrate.

The tape 100' may be superior to conventional remoistenable adhesive tape in other ways. Conventional remoistenable adhesive tapes are operable for adhering to a substrate for roughly 20-30 seconds after the water is applied thereto. Once this time elapses, the remoistenable adhesive must have water reapplied thereto for application, and this reapplication of water results in a weaker bond between the conventional tape and the substrate. In contrast, the adhesive tape 100' may be operable for adhering to a substrate for roughly 120 seconds after water is applied thereto. Moreover, when this time elapses and water is reapplied to the tape 100', the reapplication of water does not appreciably weaken the bond between the tape 100' and the substrate. As discussed with respect to the label 100, the water to dissolve and/or dispel the dissolvable liner 108' to expose the adhesive 106' may be applied and/or reapplied through a spray, via a roller (e.g., a cloth roller), etc.

Figure 8:
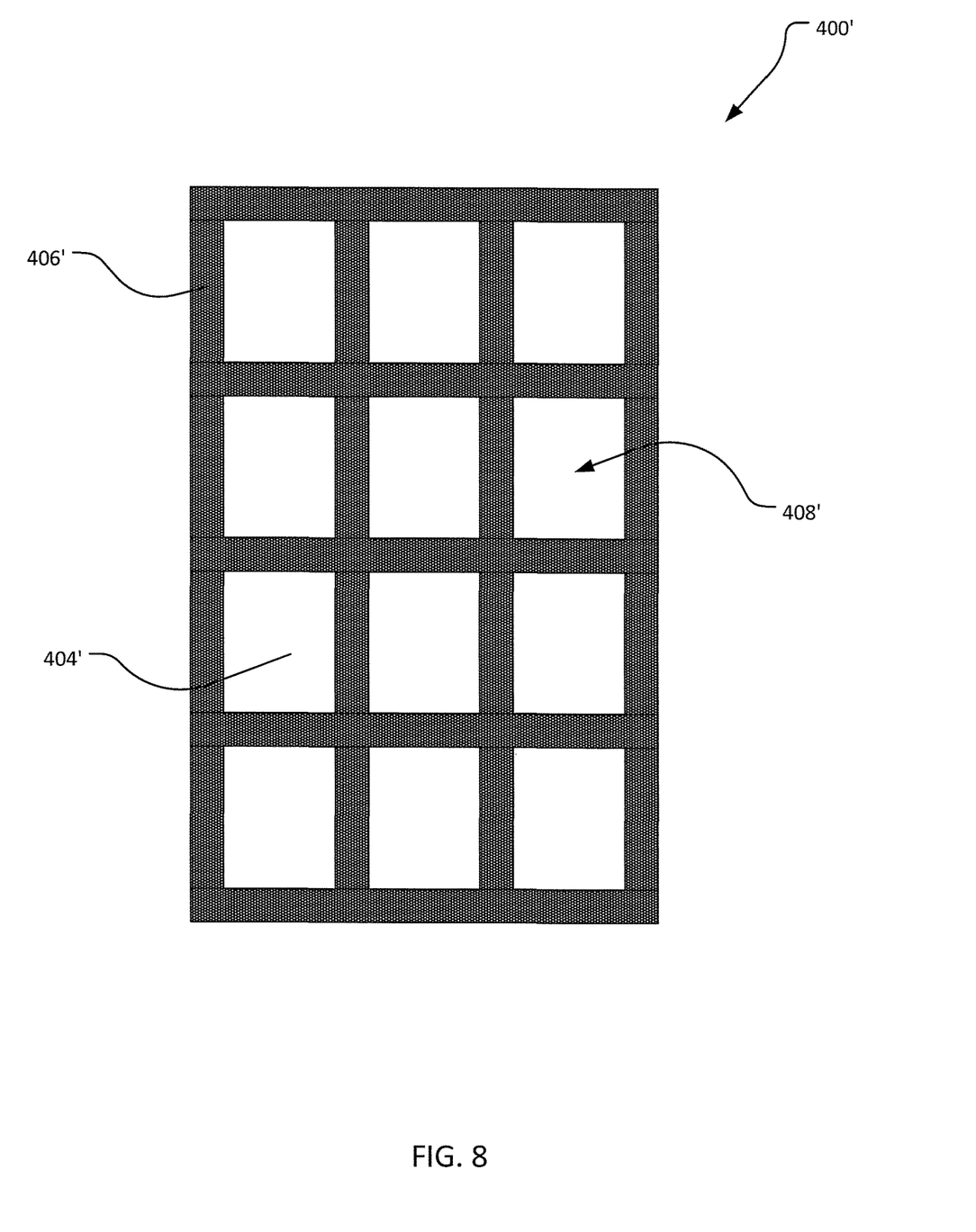
FIG. 8 is a schematic representation of yet another embodiment of tape employing a dissolvable liner.

Akin to the label embodiment 400 in FIGS. 4A-4C, an embodiment 400' of the adhesive tape may have a hydrophilic coating 404' and a pattern of adhesive 406' with openings 408' (see FIG. 8). Due to the openings 408', the adhesive tape 400' may use less materials than conventional remoistenable adhesive tape, which may in turn result in reduced overall cost. The pattern of adhesive 406' may allow the adhesive tape 400' to more effectively stick to substrates that are not readily absorbent.

Figure 6:
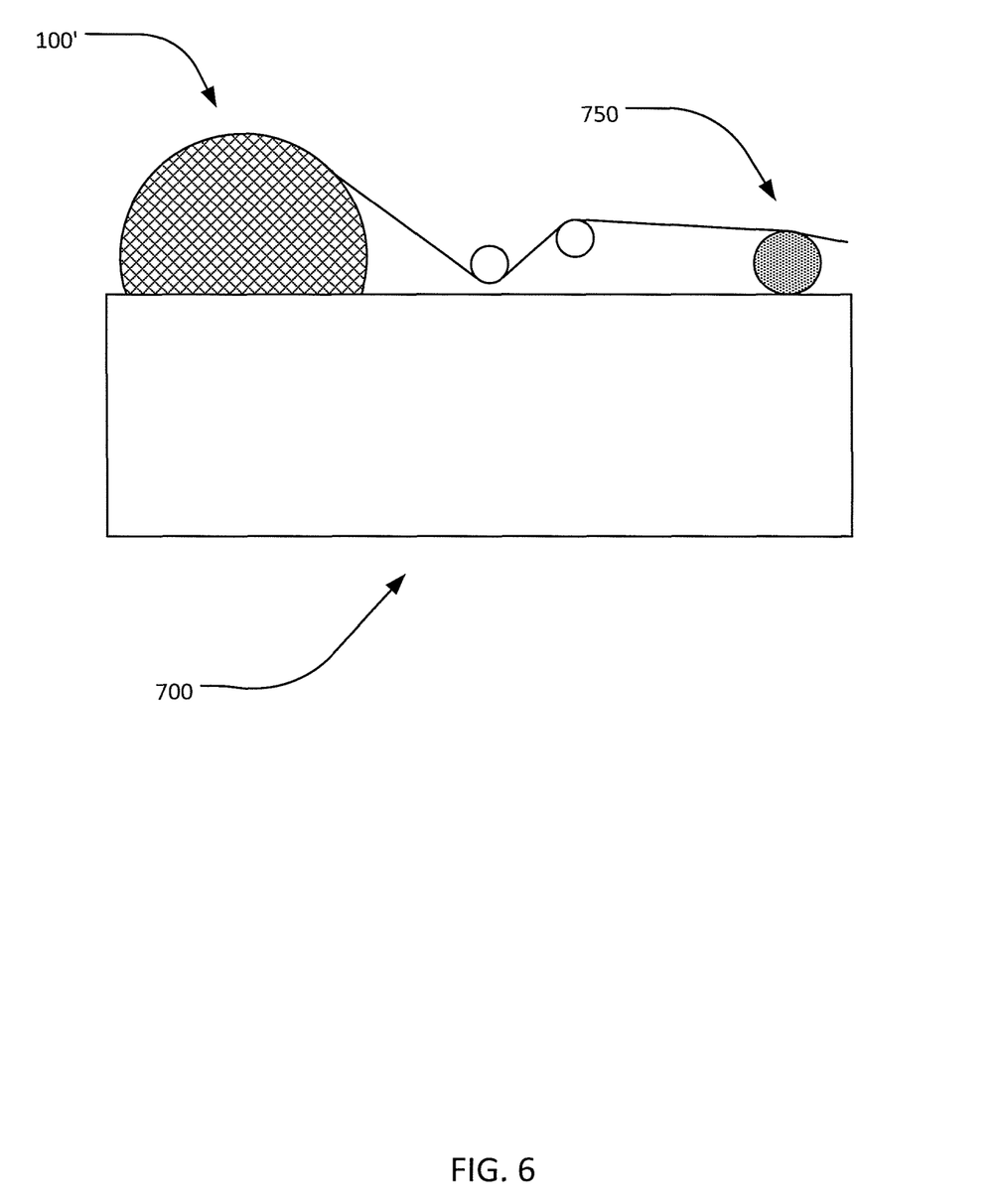
FIG. 6 is a side view of a tape dispenser employing tape with a dissolvable liner, according to another embodiment of the present disclosure.

In some embodiments, the adhesive tape 100' may be incorporated with a dispenser 700 (FIG. 6). The dispenser 700 may include a roller 750 (e.g., a cloth roller, also referred to herein as a moistener) configured to retain water for moistening the dissolvable liner 108' of the adhesive tape 100'. The adhesive tape 100' may be passed over the moistened roller 750 to apply the water necessary to dispel the dissolvable liner 108'. One advantage of the adhesive tape 100' compared to conventional remoistenable tape may be that the relatively reduced thickness of the tape 100' may allow for a greater quantity thereof to be retained for use in the dispenser 100'.

Figure 9:
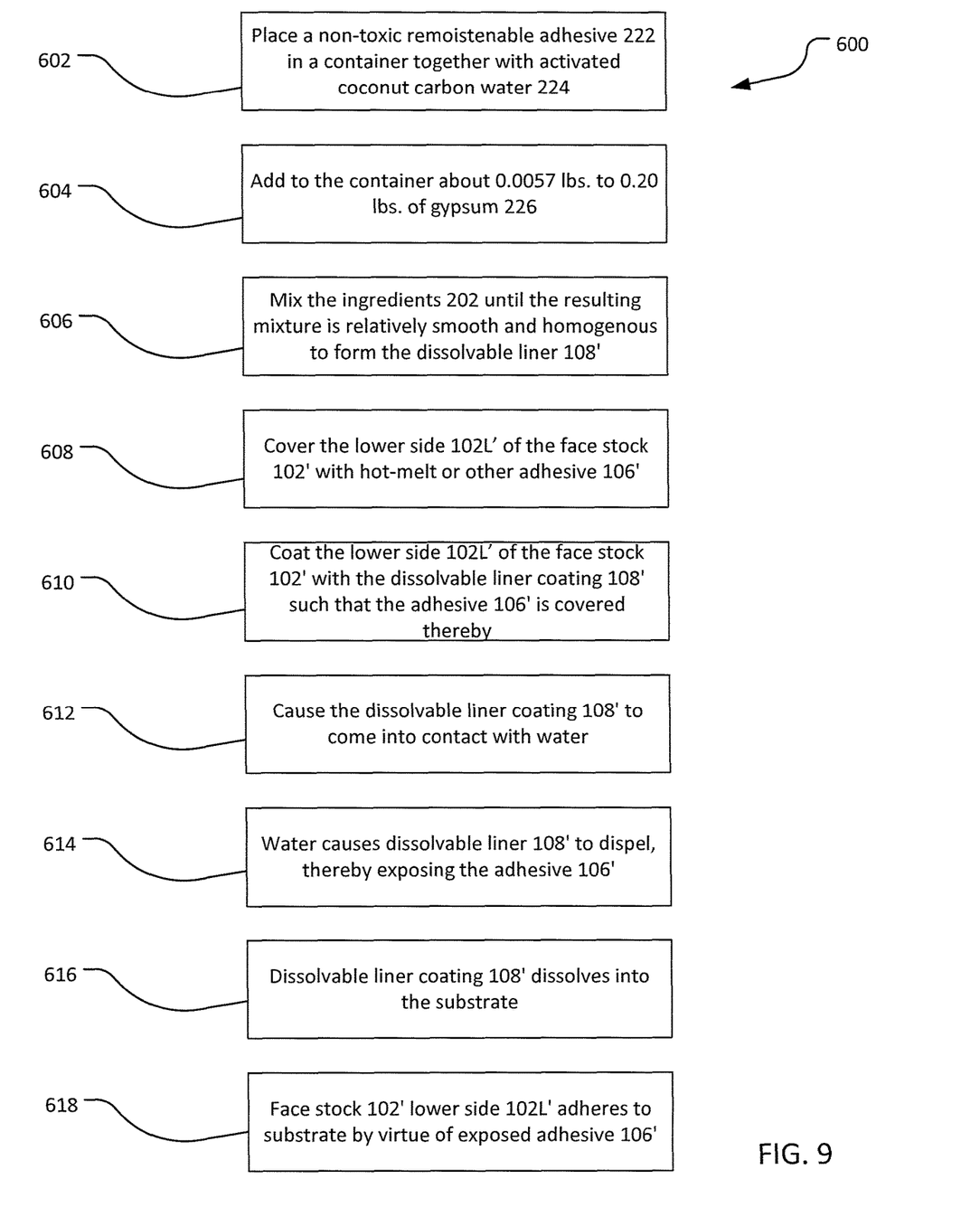
FIG. 9 is a flow chart illustrating a method of making the dissolvable liner and using tape employing the same.

A method 600 of making and using the adhesive tape 100' is illustrated in FIG. 9. First, at step 602, the non-toxic remoistenable adhesive 222 may be placed in a container with the activated coconut carbon water 224, as described above. Then, at step 604, about 0.0057 pounds to 0.20 pound of gypsum 226 may be added to the mixture. Then, at step 606, the ingredients 202 are mixed until the resulting mixture is relatively smooth and homogenous. The resulting mixture may form the dissolvable liner 108'. At step 608, the lower side 102L' of the face ply 102' of the tape 100' may be covered with an adhesive 106'. In some embodiments, the adhesive 106' is a hot-melt adhesive. In still some embodiments, the adhesive 106' may cover only some of the lower side 102L'. Then, at step 610, the lower side 102L' may be coated with the dissolvable liner 108'. The dissolvable liner 108' may be applied in a manner which covers or selectively covers the adhesive 106'.

To begin to apply the tape 100' with the dissolvable liner 108', at step 612, the dissolvable liner may be caused to come into contact with water. For example, the dissolvable liner 108' may be sprayed and/or rolled across a moist roller (e.g., roller 750 of tape dispenser 700). Then, at step 614, the applied water may cause the dissolvable liner 108' to dispel, thereby exposing the adhesive 106' underneath. Then, at step 616, the dissolvable liner 108' may dissolve into a substrate. For example, the dissolvable liner 108' may begin to dispel and become absorbed by a substrate that the tape 100' is applied to. Then, at step 618, the lower side 102L' of the face ply 102' may adhere to the substrate. For example, the face ply 102' may be adhered to the substrate by virtue of the exposed adhesive 106'.

It is to be understood that the steps of the method 600 may be modified, added to, and/or omitted as desired, and that such considerations have been contemplated and are within the scope of the present disclosure.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method of configuring tape for securement to a substrate, said tape having a face ply comprising an upper side and a lower side, said method comprising:
    formulating a dissolvable liner coating by:
        creating a mixture comprising a non-toxic remoistenable adhesive and activated coconut carbon filtered water; and
        adding gypsum to said mixture;
    situating a hot-melt adhesive on said lower side;
    covering said hot-melt adhesive on said lower side with said dissolvable liner coating; and
    using a dispenser to dispense said tape, said dispenser having a moistener for moistening said lower side, said moistening dispelling said dissolvable liner coating to expose said hot-melt adhesive.

2. The method of claim 1, wherein said moistener is a wettened roller.

3. The method of claim 1, wherein said upper side is configured for the printing of indicia.

4. The method of claim 1, further comprising waiting at least 30 seconds after said lower side is moistened to apply said tape to a substrate.

5. The method of claim 1, wherein said adhesive is applied on said lower side in a pattern.

6. The method of claim 5, wherein said pattern includes a plurality of open areas configured to allow said dissolvable liner coating to be dissolved by a hydrophilic coating.

7. The method of claim 1, wherein a weight of said gypsum in said dissolvable liner coating exceeds a weight of said activated coconut carbon filtered water.

8. The method of claim 1, wherein a weight of said gypsum added to said mixture is between 0.05 lbs and 2.8 lbs.

9. A method of configuring tape for securement to a substrate, said tape having a face ply comprising an upper side and a lower side, said method comprising:
    formulating a dissolvable liner coating by mixing a non-toxic remoistenable adhesive, activated coconut carbon filtered water, and gypsum;
    situating an adhesive on said lower side;
    covering said adhesive on said lower side with said dissolvable liner coating; and
    using a dispenser to dispense said tape, said dispenser having a moistener for moistening said lower side, said moistening dispelling said dissolvable liner coating to expose said adhesive.

10. The method of claim 9, wherein said dispenser includes a roller.

11. The method of claim 10, wherein said roller is a cloth roller.

12. The method of claim 9, wherein said upper side is configured for the printing of indicia.

13. The method of claim 9, wherein said upper side is devoid of indicia.

14. The method of claim 9, further comprising waiting at least 30 seconds after said lower side is moistened to apply said tape to a substrate.

15. The method of claim 9, wherein said adhesive is applied on said lower side in a pattern.

16. The method of claim 15, wherein said pattern includes a plurality of open areas configured to allow said dissolvable liner coating to be dissolved by a hydrophilic coating.

17. The method of claim 9, wherein a weight of said gypsum in said dissolvable liner coating exceeds a weight of said activated coconut carbon filtered water.

18. The method of claim 9, wherein a weight of said gypsum added to said mixture is between 0.05 lbs and 2.8 lbs.

19. The method of claim 9, further comprising moistening said substrate before said tape is applied thereto.

20. A method of configuring tape for securement to a substrate, said tape having a face ply comprising an upper side and a lower side, said method comprising:
    formulating a liner coating by:
        creating a mixture comprising a non-toxic remoistenable adhesive and activated coconut carbon filtered water; and
        adding gypsum to said mixture;
    situating an adhesive on said lower side;
    covering said hot-melt adhesive on said lower side with said liner coating; and
    using moisture to dispel said liner coating before said tape is applied to said substrate.

* * * * *